Sept. 3, 1968     P. F. WALKER ETAL     3,399,793
BULK HANDLING OF CYLINDRICAL BODIES WITH LEADS
Filed Nov. 10, 1965     3 Sheets-Sheet 1
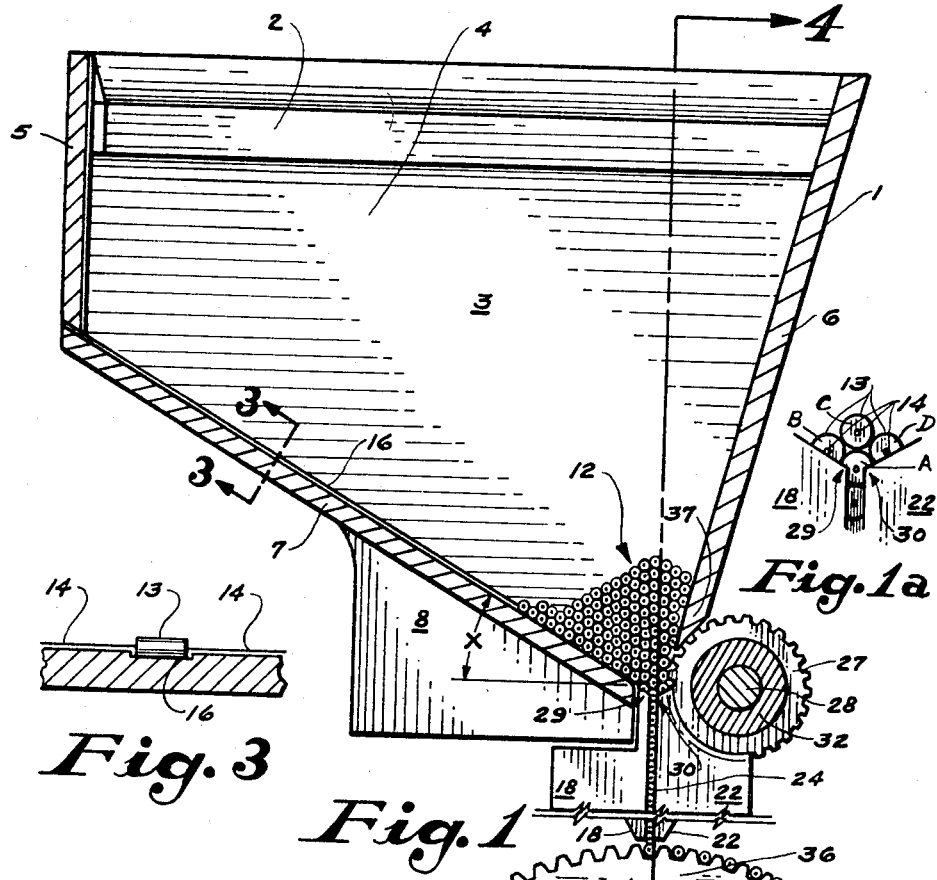
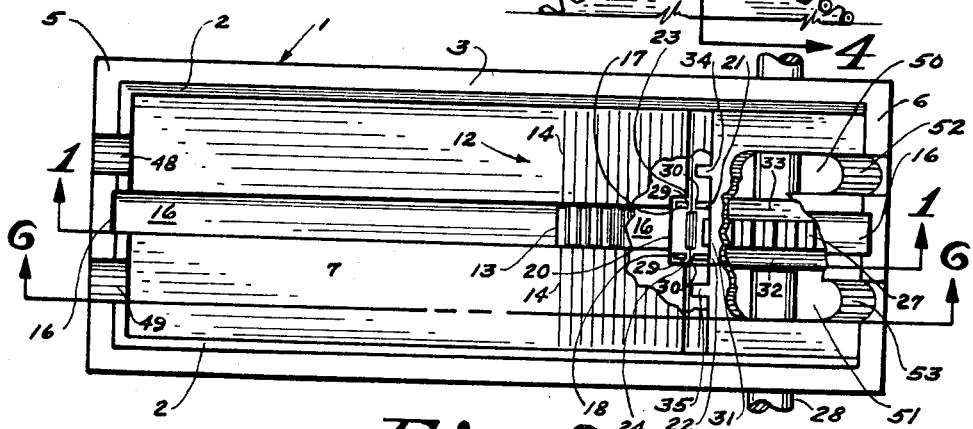
INVENTOR.
PHILIP F. WALKER
CARL M. BATCHA
HELMUT F. WEISSER

INVENTOR.
PHILIP F. WALKER
CARL M. BATCHA
HELMUT F. WEISSER

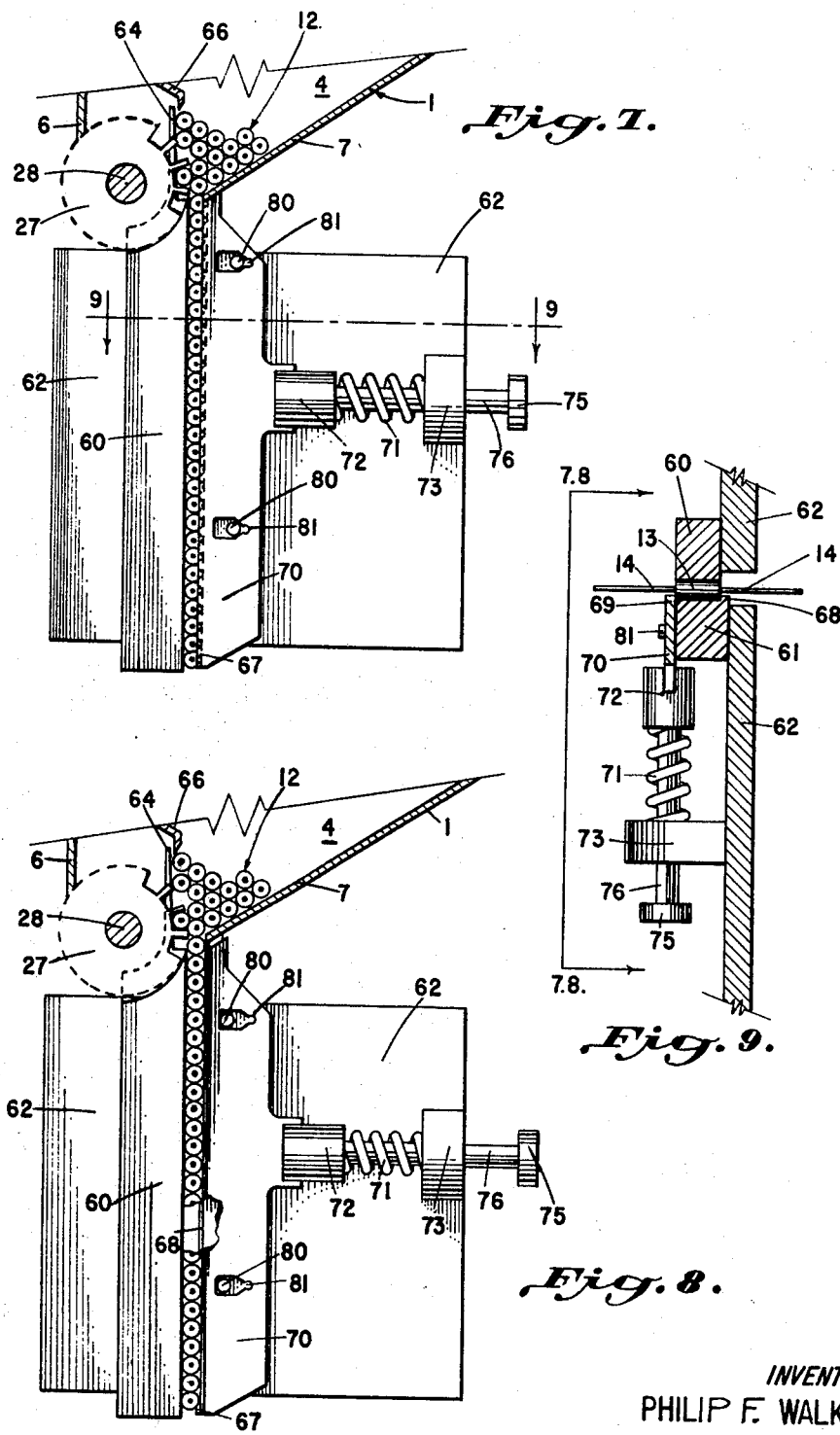

United States Patent Office 3,399,793
Patented Sept. 3, 1968

3,399,793
BULK HANDLING OF CYLINDRICAL BODIES
WITH LEADS
Philip F. Walker, Wauwatosa, and Carl M. Batcha, and
Helmut F. Weisser, Milwaukee, Wis., assignors to Allen-Bradley Company, Milwaukee, Wis., a corporation
of Wisconsin
Continuation-in-part of application Ser. No. 433,828
Jan. 18, 1965. This application Nov. 10, 1965, Ser.
No. 507,217
4 Claims. (Cl. 214—301)

ABSTRACT OF THE DISCLOSURE

An apparatus for handling at relatively high speeds cylindrical bodies with leads extending from the ends thereof. First and second plates from a slot to accommodate the cylindrical bodies. A flange restricts lateral movement of the cylindrical bodies. A hopper feeds the cylindrical bodies to the guide slot and an agitator prevents flow blockage.

---

This invention pertains to the handling of cylindrical bodies, such as electronic components; and more specifically, the handling of such bodies in a bulk arrangment with provisions for a transfer from this bulk arrangement to a more useable condition such as an in-line arrangement.

This application is a continuation-in-part of application Ser. No. 433,828, filed Jan. 18, 1965, by the same applicants.

The efficient handling of numerous cylindrical bodies such as are found in the electronic component industry is most important if one is to realize success with such a product. In the electronic industry, this handling may be associated with the manufacturer, the supplier, the user or the ultimate consumer. Presently, this handling problem is being solved through individual handling and packaging of each cylindrical body or electronic component. While the advantages of a nonindividual or bulk handling concept have been recognized, a practical and workable implementation of this concept has not become a reality.

An object, then, of this invention is to provide for the transfer of cylindrical bodies from a bulk arrangement to an in-line arrangement.

A further object of this invention is to provide for transfer of cylindrical bodies from a bulk arrangement while preventing any binding between bodies within this bulk arrangement through the use of agitator means or its equivalent.

A further object of this invention is to provide for the handling of cylindrical bodies in bulk through the use of a container and removable retainer.

A still further object of this invention is to provide for the transfer of cylindrical bodies from a bulk arrangement to an in-line arrangement by means of apparatus which is compatible to bulk handling and transfer means incorporating a container or magazine with a removable retainer.

A still further object of this invention is to provide for the transfer of cylindrical bodies from bulk utilizing a bulk container construction designed to most efficiently handle those cylindrical bodies which abut the inner walls of the container.

A still further object of this invention is to provide for guiding structure which will permit in-line arrangement of cylindrical bodies.

A still further object of this invention is to provide guide means for cylindrical bodies having lead portions extending therefrom with the guide means providing in-line arrangement through contact with the body portion of the cylindrical bodies. This arrangment provides for minimum resistance to cylindrical body movement while in the in-line arrangement and thereby permits hitherto unavailable higher passage speeds for the cylindrical bodies through the guiding means.

A still further object of this invention is to provide for the transfer of cylindrical bodies from a bulk arrangement to an in-line arrangement at speeds hitherto unavailable.

These and other objects will become apparent from the following description and explanation based upon the illustrated embodiment of the invention. It will be understood that this illustrated embodiment is included for purposes of explanation and that the scope of the invention will be found in the appended claims.

FIGURE 1 is a side, cross-sectional view of a hopper, rail or in-line guide and agitator structure used to transfer cylindrical bodies from the bulk condition.

FIGURE 1a shows the arrangement of those cylindrical bodies immediately adjacent the hopper exit.

FIGURE 2 is a top view of the apparatus shown in FIGURE 1, but incorporating fragmented portions of the agitator while eliminating those cylindrical bodies necessary to show the construction at the point of transfer from bulk to rail.

FIGURE 3 is a partial, cross-sectional view taken along line 3—3 of FIGURE 1 to show the relationship between the inner walls of the bulk hopper and the cylindrical body.

FIGURE 7 is a partial, cross-sectional front view of a modified form of the invention taken along line 7—7 of FIGURE 9.

FIGURE 8 is a partial, cross-sectional front view of the structure shown in FIGURE 7, but with the in-line slot shown in the open position for access purposes taken along line 8—8 of FIGURE 9.

FIGURE 9 is a partial, cross-sectional top view taken along line 9—9 of FIGURE 7.

Figure 4:
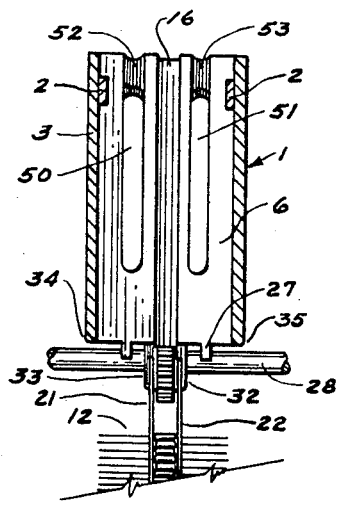
FIGURE 4 is an end, cross-sectional view taken along line 4—4 of FIGURE 1.

References to bulk or bulk arrangement herein is to be construed as cylindrical bodies which abut each other for handling in mass as opposed to isolating each body through apparatus or package.

The necessary container for handling the cylindrical bodies to which the invention is directed is illustrated by the hopper 1. At the upper portion of this hopper 1, an internally protruding ledge 2 has been constructed so as to accommodate apparatus used to transfer additional cylindrical bodies to the hopper 1. The significance of this ledge 2 will be described in more detail below.

The hopper 1 comprises side walls 3 and 4, end walls 5 and 6 and bottom wall 7 preferably inclined. Support for the bottom wall 7 is supplied by web 8 in accordance with known structural design practice.

Within the hopper 1, the cylindrical bodies, which are illustrated herein as electrical resistors and designated generally by the reference numeral 12, have a body portion 13 and leads 14 extending from either end thereof as is best seen from FIGURE 3. The latter figure further best illustrates slot 16 which is found in each of the end walls 5 and 6 as well as bottom wall 7 so as to guide those bodies 13 which abut the respective wall. It is important to note that the depth of slot 16 permits the desirable guiding feature of the bodies 13 without causing the leads 14 to touch the remaining portion of the walls 5, 6 and 7. Through this construction, minimal contact between the cylindrical bodies 12 and the hopper 1 is maintained to thereby provide the desired degree of free movement by the bodies 12. In this regard, it is pointed out that the side walls 3 and 4 are spaced so as to just clear the ends of the leads 14 and thereby provide additional guidance for the cylindrical bodies 12.

The lower ends of inclined wall 7 and end wall 6 are spaced apart so as to provide an exit for cylindrical bodies 12. Parallel plates 17 and 18 partially fill this exit and are located within groove 20 which is cut from the end of bottom wall 7, as best seen in FIGURE 2. Spaced from these plates 17 and 18 are parallel plates 21 and 22 so as to provide guide slots 23 and 24 therebetween. These guide slots establish an in-line path for the cylindrical bodies which in combination with parallel plates 17, 18, 21 and 22 form said path generally termed the rail portion or simply the rail. The plates 18 and 22 in FIGURE 1 are shown in fragmented form although actual length is a function of the distance the cylindrical bodies 12 are to be transferred by the rail.

The surfaces of parallel plates 17 and 18 which are exposed to the inside of hopper 1 are preferably inclined in the same manner as bottom wall 7. Likewise, those surfaces of parallel plates 21 and 22 which are adjacent the inside of hopper 1 are inclined at an angle similar to that of the corresponding surfaces on plates 17 and 18. An agitator, illustrated herein by gear 27, completes the opening between walls 6 and 7 at a point adjacent to the parallel plates 17, 18, 21 and 22. As is best shown in FIGURE 1, gear 27 rotates about shaft 28 which in turn is preferably centered on a line running through the lowest point in hopper 1, viz., edge 29 of plates 17 and 18 or edge 30 of plates 21 and 22. Hubs 32 and 33 locate gear 27 on shaft 28 which is connected to an external power source not shown. Additional guidance is provided those cylindrical bodies 12 coming in contact with end wall 6 through guide pins 34 and 35 extending from the lower end of end wall 6 and are best seen in FIGURE 4.

Once the cylindrical bodies 12 reach slots 23 and 24 they may be transferred to other units such as the dial 36 shown in part by FIGURE 1. Further advantage may be found in constructing knock-off 37 to be separate from the hopper 1, especially when hopper 1 is to be vibrated since separate construction maintains a constant relationship between the knock-off 37 and the agitator 27.

The operation of the invention described to this point comprises filling the hopper 1 such that the body portions 13 of cylindrical bodies 12 are stacked one immediately above the other and the leads 14 are parallel to each other. As is shown in FIGURE 2, those bodies 13 which come in contact with the walls 5, 6 or 7 will be guided by the groove 16 therein. Through gravity, vibration of the hopper 1 or other suitable means, the cylindrical bodies 12 will find their way to the exit of hopper 1 between walls 6 and 7. Those cylindrical bodies 12 which are adjacent the bottom wall 7, ride in the groove 16 until each individually reaches parallel plates 17 and 18 at which time the support for the cylindrical body 12 is transferred to leads 14. Similarly, those cylindrical bodies 12 which abut the end wall 6 make contact with this wall through groove 16 until such time as the cylindrical body drops below the groove 16 (see FIGURE 4). Depending on the type and position of the agitator 27, the leads 14 of a respective cylindrical body 12 may or may not come in contact with the guide pins 34 and 35. It should be noted that wall 7 and plates 17 and 18 may be so designed that the leads 14 do not perform a support function.

The primary purpose of the agitator, herein illustrated as gear 27, is to prevent interruption of the flow of cylindrical bodies 12 from hopper 1, which is accomplished, for example, by breaking-up the arch periodically formed by those cylindrical bodies 12 at the entrance to the slots 23 and 24. This can be illustrated by FIGURES 1 and 1a wherein those cylindrical bodies 12 which surround cylindrical body A, just entering the slots 23 and 24, viz., cylindrical bodies B, C, and D, form an arch. Often the forces between these bodies B, C, and D caused in part by the overhead weight, establish a permanent arch and thereby prevent further feeding of the slots 23 and 24. By breaking this arch, for example by moving cylindrical body D, the path to slots 23 and 24 is kept open. The agitator in FIGURE 1 represented by gear 27 performs this necessary function by continually moving that cylindrical body 12 which assumes the D position; although it should be noted that other forms of agitators could be used such as a knurled wheel or a reciprocating arm.

Further advantage has been found in causing the cylindrical bodies 12 to arrange themselves in a particular way immediately above the slots 23 and 24. This is illustrated by the arrangement of cylindrical bodies 12 shown in FIGURE 1 and accomplished by locating the bottom wall 7 at an angle of 30 degrees to a line perpendicular to the slots 23 and 24, i.e., the angle X would be 30 degrees. The use of this particular angle for the bottom wall 7 causes the cylindrical bodies 12 to arrange themselves in rows thus reducing internal resistance between cylindrical bodies to a minimum. Moreover, this arrangement supplies rows which are parallel to the slots 23 and 24 to thereby establish a force vector immediately above slots 23 and 24 (through the weight of and gravitational pull on those cylindrical bodies 12 in this parallel run) in the desired direction of movement within the slots 23 and 24 as well as to cause a more regular pattern among the cylindrical bodies 12 at the point where objectionable binding occurs, i.e., immediately above the slots 23 and 24, to thereby establish the most desired conditions for proper functioning of the agitator or gear 27, e.g., such a regular pattern is an assurance that gear 27 will always contact the one cylindrical body 12 which when moved will eliminate the binding.

The cylindrical bodies 12 are brought to the hopper 1 in container 40 with removable retainer 41 closing the one open side of container 40. As is the case with the hopper 1, the width of container 40 is just wide enough to accommodate the cylindrical bodies 12 and thereby provide the guidance necessary.

The removable retainer 41 is preferably a fork construction with prongs 42 and 43 which abut the leads 14. Since the cylindrical bodies 12 are stacked within the container 40 in bulk form, it is important that the prongs 42 and 43 prevent the leads 14 from creeping over the edge of container 40. This is accomplished in FIGURE 5 through the use of slots 44 and 45 found in each of the prongs 42 and 43, so that the cylindrical bodies 12 within container 40 abut the prongs 42 and 43 below the edge of the open side in container 40.

To transfer the cylindrical bodies 12 from container 40 to the hopper 1 container 40 is inverted, preferably by rotating it end to end; and thereafter the container 40 is placed in the ledge 2 in the hopper 1. Initially prongs 42 and 43 fit into the hopper 1 through the slots 48 and 49 in end wall 5, which slots are open at the ledge 2 end of the hopper 1 so as to permit entry of removable retainer 41 therein without changing the relationship between the removable retainer 41, the container 40 and the cylindrical bodies 12 therein. End wall 6 includes closed slots 50 and 51 so as to accommodate the prongs 42 and 43; but immediately above slots 50 and 51 are grooves 52 and 53.

Figure 5:
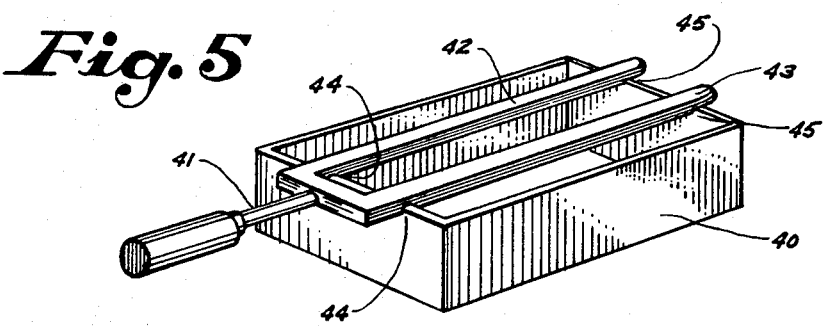
FIGURE 5 is an isometric view of a bulk container with a removable retainer located thereon in the retaining position.

Transferring the cylindrical body 12 in bulk form from the container 40 to the hopper 1 comprises inverting the container 40 from the position of FIGURE 5 after which the container 40 approaches the ledge 2 of hopper 1 at a slight angle so that the ends of prongs 42 and 43 first engage the grooves 52 and 53 in the end wall 6. Using these grooves 52 and 53 for guiding purposes, the container 40 is guided into the position of FIGURE 6 while the ends of prongs 42 and 43 in the grooves 52 and 53 are slid downwardly towards the slots 50 and 51. Once the container 40 is in the FIGURE 6 position, the removable retainer 41 can be lowered to the position shown on FIGURE 6, i.e., at the bottom of the respective slots in walls 5 and 6, and then pulled out through the slots 48 and 49 in wall 5. Withdrawal of removable retainer 41, leaves the cylindrical bodies 12 free to fill the hopper 1.

Figure 6:
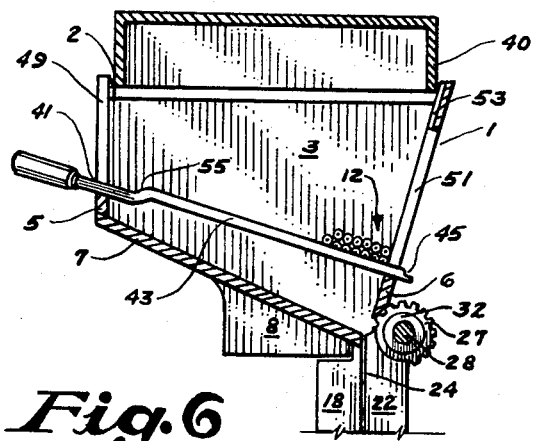
FIGURE 6 is a side, cross-sectional view taken along line 5—5 of FIGURE 2 similar to the view shown in FIGURE 1. This figure illustrates the use of the bulk container and a variation of the removable retainer of FIGURE 5 for handling and transferring these cylindrical bodies.

The removable retainer 41 in FIGURE 6 has a slight variation from that shown in FIGURE 5 in that the groove 44 is replaced by a bend in the prongs 42 and 43 at 55.

FIGURES 7, 8 and 9 show a modification of the invention described above. The hopper 1 is similar to that shown in FIGURES 1, 2 and 6; and therefore is shown here only in part with side wall 4, end wall 6 and bottom wall 7. Similarly mounted with respect to the hopper 1 is the agitator or gear 27 on shaft 28. The rail portion is made from guide plates 60 and 61 with each of these guide plates 60 and 61 being attached to support structure 62 (see FIGURE 9).

A portion of a guide plate 60, viz. guide portion 64, extends between two halves of the gear or agitator 27 to provide support for the cylindrical bodies much in the manner of guide pins 34 and 35 as shown in FIGURE 4. Note, however, that through the use of guide portion 64, the cylindrical bodies 12 are guided by contact with the body portion 13 and not the leads 14 as is the case in FIGURE 4. By guiding those cylindrical bodies 12 adjacent to and moved by the agitator or gear 27 by means of contact with the body portion 13 rather than the leads 14, a more stable condition is established among the cylindrical bodies 12 in the hopper 1, especially those bodies 12 near the exit of hopper 1 leading to the rails. Such a stable condition permits increased passage speed with constant flow for the cylindrical bodies 12 as they move from the bulk arrangement in the hopper 1 to the in-line arrangement in slot 67.

The pattern of the cylindrical bodies 12 as they approach the agitator or gear 27 at the exit end of the hopper 1 is essentially the same as that shown in FIGURE 1. The potential blockage or binding created by the cylindrical bodies 12 themselves, as has been previously described to include the potential arch between adjacent cylindrical bodies 12 at the agitator or gear 27, is also the same as that which has been previously described. As is shown in FIGURES 7 and 8 the agitator or gear 27 moves those adjacent cylindrical bodies 12 through a counter clockwise motion so as to prevent the above mentioned binding among the cylindrical bodies 12. In this modified form of FIGURES 7–9, the end wall 6 has been extended over the agitator 27 so as to direct the cylindrical bodies 12 into an area bounded by portion 64 and wall 7.

The guide plate 60 and 61 establish a slot 67 therebetween through which the cylindrical bodies pass in an in-line fashion. At least one of these guide means 60 and 61, herein guide means 61, has flange portions 68 and 69 which partially close either end of the slot 67 to restrict lateral movement of the body portion 13 but at the same time being located so as to not interfere with the leads 14 of the cylindrical bodies 12. Thus, the cylindrical bodies 12 are guided through the slot 67 by means of the body portion 13 contacting the guide plate 60 and 61 rather than the leads 14 providing the contact as is the case in FIGURES 1, 2, 4 and 6.

Using the body portion rather than the leads 14 for guiding, results in more advantageous operating conditions such as higher passage speeds of the bodies 12 through the slot 67 since there is less friction and therefore less resistance. The higher friction developed with lead guiding results in part from excessive contact between the rail (e.g., the slots established by plates 17, 18, 21 and 22—see FIGURE 2) and the leads 14. This excess contact is a consequence of lead bending as the leads 14 provide the necessary guiding. In addition, potential damage to the leads 14 is reduced by not relying upon these thin and fragile elements for guiding purposes. The leads 14 are many times coated with various materials, which coatings have a tendency to be rubbed off upon those objects with which the leads 14 come in contact. Thus, when the leads 14 are used to guide the cylindrical bodies 12, any material which coats the leads 14 may rub off on the guiding surface which material, over a period of time, will build up upon the edges of guide slot to reduce the clearance for the lead and necessarily restrict or block the flow of cylindrical bodies 12.

Many times it is advantageous to remove one or more of the cylindrical bodies 12 that are in the slot 67. To accomplish this end, at least one of the flanges 68 and 69 is constructed so as to be movable. In the FIGURES 7 through 9 the flange 69 is a part of a movable piece 70 which is spring loaded by compression spring 71. This spring 71 abuts the movable portion 70 at the block 72 and also abuts the support 73 which is fixed to the support structure 62 (see FIGURE 9). The operating handle 75, which is a part of the block 72 and connected thereto by means of a shaft 76, is used to move the movable piece 70 against the compression spring 71 and thereby free the cylindrical bodies 12 for removal from slot 67 (FIGURE 8). Guide pins 80 in slots 81 of the movable piece 70 restrict the motion of the piece 70. Thus, by moving the piece 70 from its position as shown in FIGURE 7 to that position as shown in FIGURE 8, the cylindrical bodies 12 are free to be removed from the slot 67.

From the above description of an illustrative embodiment of the invention it will be readily seen that the invention provides a most efficient and reliable means for handling and transferring cylindrical bodies in bulk. The following claims set forth the scope of the invention.

We claim:
1. Apparatus able to handle at relatively high speeds cylindrical bodies with body portions and lead means of a diameter smaller than said body portions and extending therefrom as a continuous feed including rail means for guiding said bodies in an in-line arrangement comprising:
   (a) first guide plate means,
   (b) second guide plate means substantially parallel to said first guide plate means to establish a slot therebetween so as to accommodate said cylindrical bodies in said in-line arrangement,
   (c) only said guide means form said slot,
   (d) flange means adjacent only one said guide means at said slot providing minimum closure of said slot so as to restrict lateral movement of said body portions therein without interfering with said lead means.
   (e) hopper means having an exit located adjacent an end of said rail means so as to feed said cylindrical bodies to said rail means,
   (f) said cylindrical bodies in said hopper contact each other at said body portions and are guided in said hopper by hopper walls and by contact therebetween with said body portions,
   (g) said rail means located at said hopper exit so as to receive said cylindrical bodies and thereby maintain said contact between said body portions and maintain said guidance by contact with said body portions.

2. The apparatus of claim 1 including means to move at least one of said flange means so as to open a respective slot end and permit removal of selected cylindrical bodies.

3. The apparatus of claim 1 in combination with means to provide for transfer of said cylindrical bodies from a bulk arrangement to said in-line arrangement comprising:
   (a) hopper means for holding said cylindrical bodies in said bulk arrangement,
   (b) an exit in said hopper means for said cylindrical bodies, (c) said rail means attached to said hopper means at said exit so as to carry said cylindrical bodies away from said hopper means in said in-line arrangement, (d) agitator means at said exit which contact at least one said cylindrical body adjacent to said rail means and thereby prevent flow blockage caused by said bodies.

(e) guide means in said hopper means adjacent said agitator means which guide means contact said body portion of adjacent cylindrical bodies including said at least one said cylindrical body.

4. The apparatus of claim 3 including:

(a) container means for bringing said cylindrical bodies in bulk to said hopper means at said open top and having removable retainer means for an open side therein, (b) said removable retainer means including prong means which are guided by said slot means to lower said cylindrical bodies into said hopper means.

References Cited
UNITED STATES PATENTS

| | | | |
|---|---|---|---|
| 1,124,417 | 1/1915 | Goddu | 193—38 |
| 2,704,144 | 3/1955 | Rety et al. | 193—38 |
| 2,908,909 | 10/1959 | Stolecki et al. | 221—73 X |
| 3,307,723 | 3/1967 | Walker et al. | 214—302 |

HUGO O. SCHULZ, *Primary Examiner.*